Jan. 16, 1962 YOSHIRO NAKAMATSU 3,016,790

MOVIE SYSTEM ADAPTED FOR SIMULTANEOUSLY ENLARGING AND REDUCING A PROJECTED IMAGE AND THE AREA OF AN ASSOCIATED SCREEN

Filed Aug. 21, 1957 3 Sheets-Sheet 1

United States Patent Office 3,016,790 Patented Jan. 16, 1962

3,016,790

MOVIE SYSTEM ADAPTED FOR SIMULTANEOUSLY ENLARGING AND REDUCING A PROJECTED IMAGE AND THE AREA OF AN ASSOCIATED SCREEN

Yoshiro Nakamatsu, 2-62 Shimoouma-cho, Setagay-ku, Tokyo, Japan

Filed Aug. 21, 1957, Ser. No. 679,503
Claims priority, application Japan Aug. 22, 1956
3 Claims. (Cl. 88—16)

This invention relates to movie systems which can automatically enlarge or shrink images.

It is an object of the invention to provide an improved movie system.

It is a further object of the invention to provide an improved movie system which in turn provides selectively for enlarging and reducing images.

It is still another object of the invention to provide an improved movie system which provides for automatically enlarging and reducing the area of a screen upon which an image is to be projected.

It is still another object of the invention to provide an improved movie system in which automatic provision is made for the simultaneous enlarging and reducing of an image projected and the associated screen.

To achieve the above and other of its objectives, the invention contemplates the provision of a projection system comprising two lens systems involving the use of a master lens and an ordinary lens in operative association with an anamorphic lens. This system is employed in connection with film having indicia thereupon which controls the operation of a movable gear system whereby the lenses are arranged in different operative associations to control the projection of an image. At the same time a screen arrangement is provided which is also responsive to the indicia on the film for changing size in accordance with the requirements of the projected image.

The characteristics and advantages of this invention will be understood from the following detailed description as illustrated in the accompanying drawings in which.

Figures 1, 2, 3A, 3B, 4A, 4B, 4C:
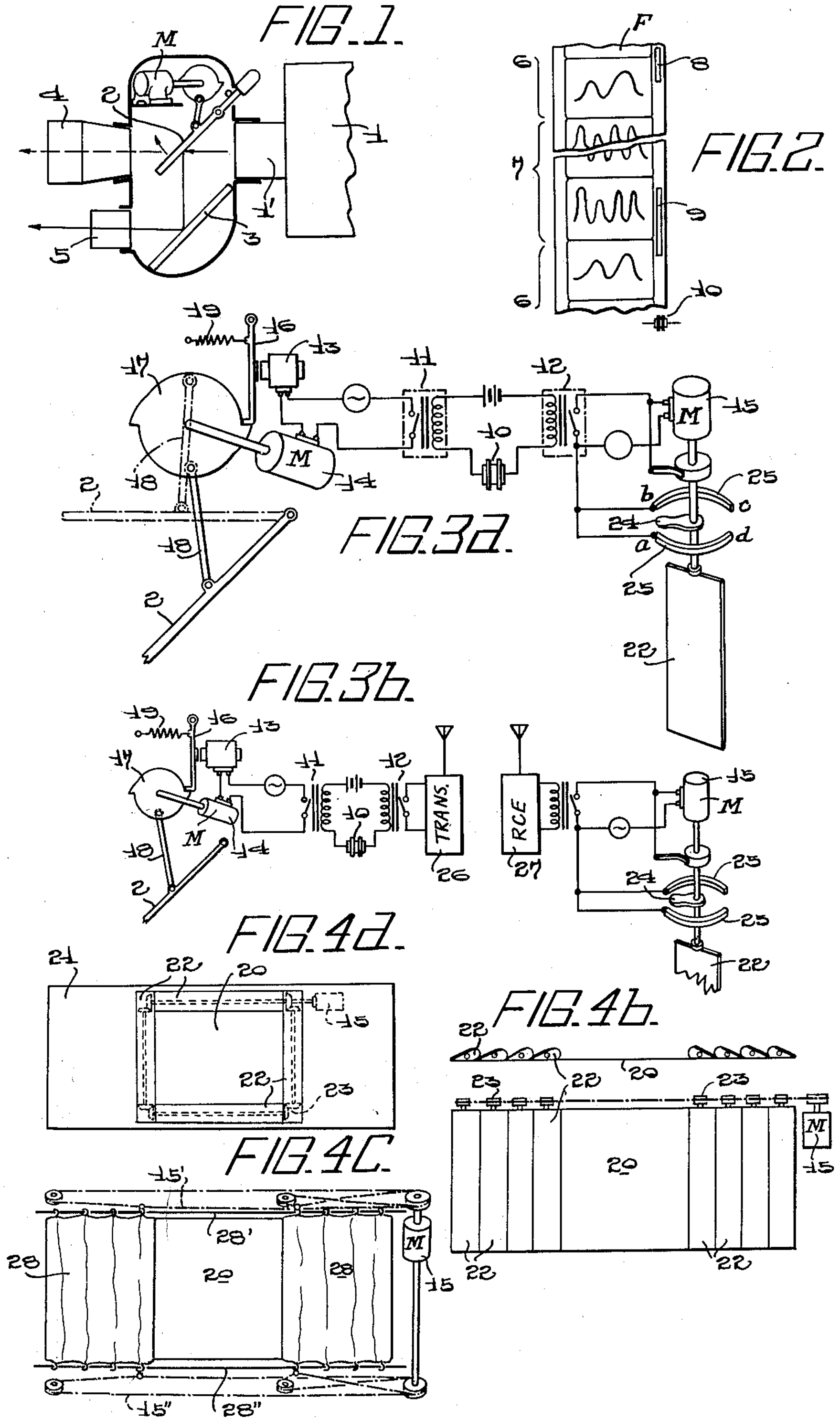
FIG. 1 is a side view illustrating apparatus for the enlargement and shrinking of an image according to one embodiment of the present invention.
FIG. 2 is a plan view of a film according to the present invention.
Figure 5:
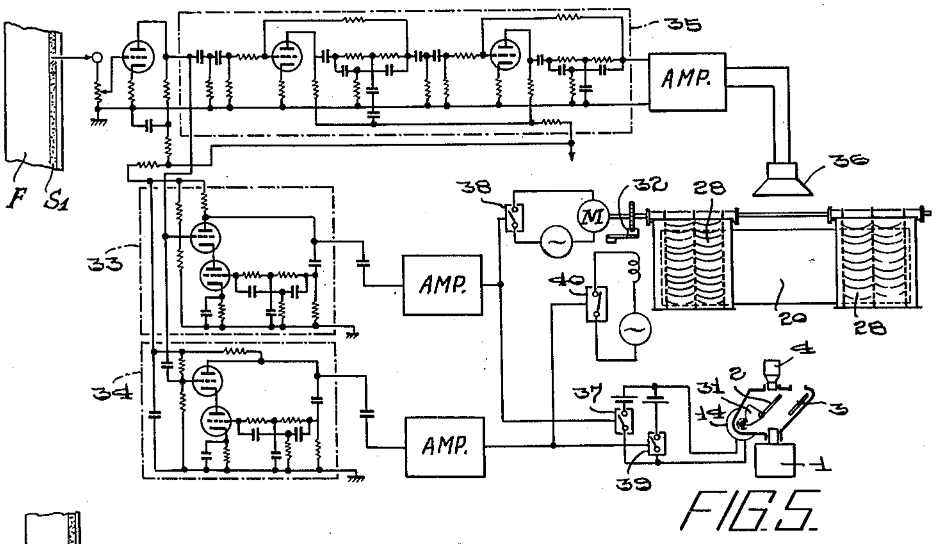
Figure 6:
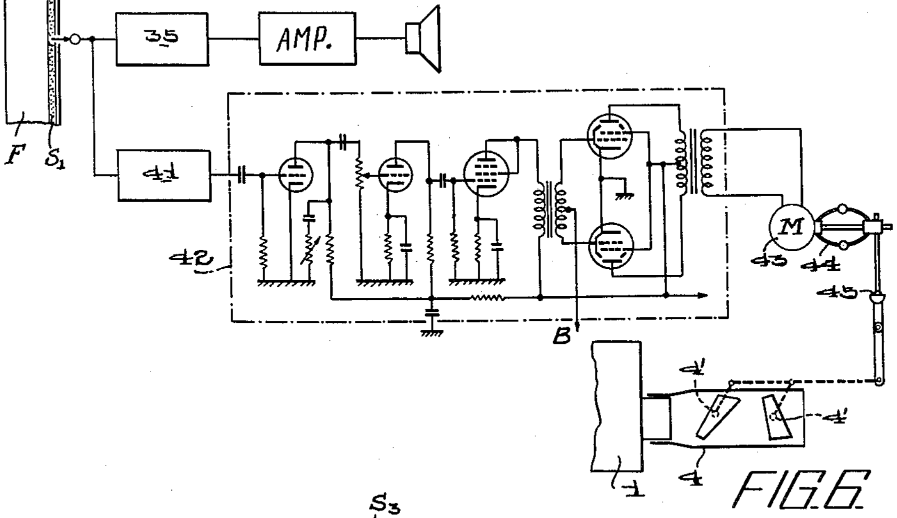
Figure 8:
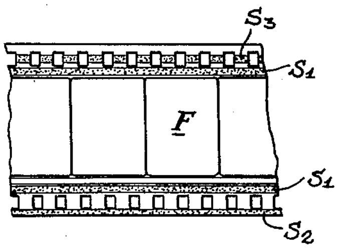
Figure 7:
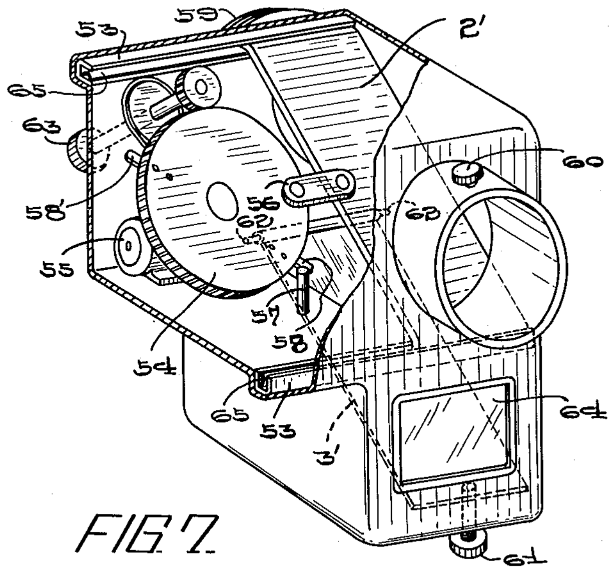
Figures 9, 10:
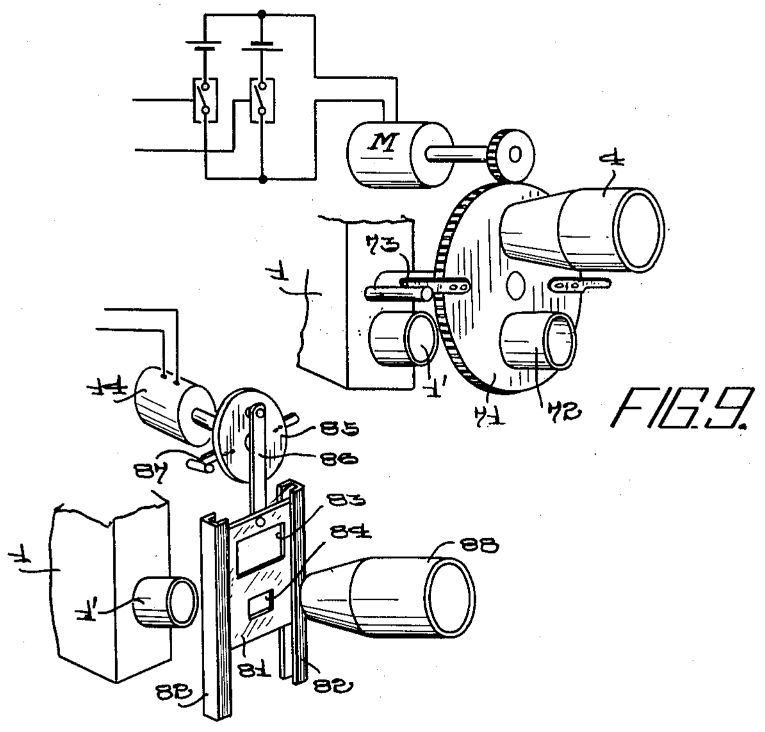

FIGS. 3*a* and *b* are diagrammatic views of two devices for operating the movable parts in the system of the present invention;

FIGS. 4*a*, *b* and *c* are front views of some examples of screens in the movie system according to the present invention;

FIG. 5 illustrates an embodiment wherein a signal frequency is recorded in the sound track of a film;

FIG. 6 illustrates another embodiment of the invention similar to the embodiment of FIG. 5 but wherein the screen is enlarged or reduced gradually and continuously;

FIG. 7 is a perspective view of another embodiment of the apparatus for the enlargement and reduction of an image according to the present invention;

FIG. 8 is a plan view of a film which may be used in the movie system of this invention;

FIG. 9 is a perspective view of another movie system according to this invention wherein a turret is employed for the replacement of an anamorphic lens; and FIG. 10 is a perspective view of another movie system according to this invention wherein a plate having apertures of different sizes is used for changing the angle of viewing of an image.

In FIG. 1, in front of a projector 1 is arranged an attachment assembly comprising a movable mirror 2, a fixed mirror 3, an anamorphic lens 4 and a further ordinary lens 5. The movable mirror 2 can be pivoted around a pivot and when it is in the lowered position as shown in FIG. 1, a ray coming from the projector is reflected by the mirror 2 and the fixed mirror 3 to pass through the ordinary lens 5 to form an image on a screen (not shown). On the other hand, when the movable mirror 2 is in the upper position, the ray from the projector 1 passes directly through the anamorphic lens 4 to form an enlarged image on a screen under the influence of said lens. If desired, the above mentioned ordinary lens 5 may be omitted since the ray from the master lens of a projector, after being reflected by the mirror 2 in the lower position, is reflected again by the mirror 3 and can form an image on a screen, even if there is no lens 5.

The film (FIG. 2) used for the movie system of this invention has a part 6 for use with an ordinary lens and a part 7 for use with an anamorphic lens, the parts being connected together to form a continuous film, and foils of conductive material (e.g. aluminum foils) affixed on said film at predetermined places for the synchronous changing of the sizes of an image and a screen. When this film passes through a projector, the conductive foils 8 and 9 make or break contact with a detector 10 (FIG. 3) according to the progress of the film. When the foil 8 comes into contact with the detector 10, a relay 11 acts to raise the mirror 2 to project the image 7 of the film on a screen through the anamorphic lens 4. It is arranged at the same time to enlarge the screen automatically as explained hereafter. When the film proceeds further and the foil 9 comes into contact with the detector 10, the detector acts to lower the rotary mirror 2 and at the same time to reduce the area of the screen, and the image of the part 6 of the film is projected on the screen through the master lens 1' and the ordinary lens 5 of the attachment assembly.

FIG. 3 illustrates in greater detail a device for the operation described above. The detector 10 has a form of a pulley comprising a layer of non-conductive material inserted between two layers of conductive material, and is arranged to run along the edge of the film. When the detector 10 comes into contact with one of the conductive foils 8 or 9, a circuit is closed to put relays 11 and 12 in operation and a magnet coil 13 (solenoid) and motors 14 and 15 are energized. The magnet coil 13 now attracts a locking element 16 to allow the rotation of a disc 17 and the disc 17 is rotated by the motor 14 in counter clockwise direction. A connecting rod 18 is hinged on the disc 17 at one end and on the pivotable mirror 2 on the other end and the rotation of the disc lifts the mirror 2 until it reaches the upper position as shown in dotted lines. When the mirror 2 is lifted to the upper position, the current in the motor 14 and the coil 13 is cut off and the locking element 16 is returned to the locking position by the action of a spring 19. Thus the position of the rotary mirror 2 is fixed in its upper position. Therefore a projected image is enlarged by anamorphic lens 4. When the film proceeds further and the conductive foil 9 of the film comes into contact with the detector 10, by an operation similar to that described above, the disc 17 is again rotated by an angle 180° and the pivotal mirror 2 is fixed in its lower position. Therefore a projected image is restored to ordinary size.

When the mirror 2 is moved as described above, the area of the screen, on which the image 6 or 7 of the film is projected, is also enlarged or contracted or reduced simultaneously by a device as shown in FIGS. 4*a*, *b* and by way of example.

FIG. 4*a* illustrates a screen comprising a central portion 20 surrounded by four oblong plates 22 and an outer portion 21. Said oblong plates 22 have a white front surface and a black back surface respectively and each is rotatable about its central longitudinal axis by means of gears 23 fixed on the central longitudinal axis and driven by a motor 15. See also FIGS. 3*a* and 3*b*. When the oblong plates 22 are turned to expose their front white surfaces, an enlarged screen is obtained by combination with the central portion 20 and the outer portion 21 while when they are turned to expose their back black surfaces, a reduced screen or a normal screen is obtained by the central portion 20 only.

As shown in FIG. 3*a* the turning of the oblong plates 22 can be effected by means of a relay 12 and a motor 15 which are energized by the detector 10. When the rotary contacting element 24 is at (*a*) on one of the half-rings 25 and the relay 12 is operated, the rotation of the motor 15 causes the screen or oblong plate 22 to rotate and the contacting element 24, having been carried over the gap between (*a*) and (*b*), will be brought into contact with the other half ring 25. The contacting half ring 25 establishes a circuit for supplying electricity to the motor 15, and therefore, after the element 24 reaches (*b*), the plate can be maintained in rotation even if the switch of the relay 12 is opened until the element 24 reaches (*c*). The contacting half rings 25 may be omitted but it is preferable to provide this device in order to secure the rotation of the plate 22 by 180°, in view of the fact that the plate 22 is relatively of a large size and mass and the operation by means of the relay 12 only may be insufficient to accomplish the desired rotation.

Thus the oblong plates 22 are turned by an angle of 180° and cooperate to constitute an enlarged screen with other portions. As the film proceeds and the conductive foil 9 of the film comes into contact with the detector 10, the contacting element 24 is rotated from (*c*) to (*d*) over the gap between them by means of the relay 12 and reaches (*a*) where the rotation is stopped again. Thus the oblong plates 22 are turned to expose their black back surfaces and the screen is made to expose only the central portion to form a contracted or reduced screen.

The distance between a screen and a projector is relatively large, and hence it is often convenient to carry out the operation as described above by means of wireless. FIG. 3*b* illustrates one of the embodiments employing wireless techniques. In this device, a signal of the detector 10 is transmitted from a transmitter 26 arranged in a projector and is received by a receiving device 27 arranged in the vicinity of a screen to carry out the operation as described above.

FIG. 4*b* is another means for varying the area of a screen. The screen has a central portion 20 and is provided with a plurality of oblong plates 22 arranged on both sides as shown in the drawing. Each of these oblong plates 22 can be turned simultaneously around its central longitudinal axis to expose its white front surface or black back surface to enlarge or reduce the area of the screen by means of gears 23 and a motor 15.

FIG. 4*c* illustrates another means for the enlargement or reduction of the area of a screen. In this embodiment, a large screen is covered by masks 28 arranged on opposite side end parts to leave a central part when the masks 28 are placed in covering position. The masks 28 can be drawn aside to expose the large area of the screen by a motor 15 which is controlled by a signal from a projector and acts to pull upper cord 15′ and lower cord 15″ to move the masks 28 along an upper guiding rail 28′ and a lower guiding rail 28″. It is evident that the masks 28 are returned to their covering position to form a narrow screen when the motor 15 is operated in reversed direction.

FIG. 5 illustrates another embodiment for the operation of this movie system. According to this embodiment, the conductive foils 8 and 9 on the edge of a film as illustrated in FIG. 2 are replaced by recording signals of particular frequencies recorded on sound track of a film. In FIG. 5, a film F has a sound record track $S_1$ (for example, of frequency in the range of cycle from 45 to 12,000) and in said track are recorded signals of a particular frequency (for example, in the range from 30 to 35 cycles) in addition to the above sound recording. When the sound track is reproduced, these signals are divided into the signal frequency and the sound frequency by means of filters 33, 34 and 35 and the sound frequency is reproduced as sound through a speaker 36 while the signal frequency is utilized for the operation of relays 37, 38, 39 and 40.

For instance, when the signal frequency for the enlargement of the screen is 30 cycles, relays 37 and 38 are operated by said signal to rotate motors 14 and 15. The motor 14 acts to lift a mirror 2 through a gear 31 and consequently an image will be projected from the projector through an enlargement lens 4 (anamorphic or wide angle lens) on a screen to obtain an enlarged image while at the same time the screen is enlarged by the withdrawal of masks 28 on the opposite ends of the screen 20 by means of a motor 15. In the drawing, 32 is a stop for the prevention of reversed rotation of the winding axle of the mask 28.

When a signal for reducing the screen (for example, 35 cycles) is given, relays 39 and 40 are operated to rotate the motor 14 in reversed direction to lower the mirror 2 in down position to give a shrunken or contracted image on the screen and at the same time a relay 40 is operated to release the stop 32 to allow the lowering of the curtain by its weight to shrink the area of the screen.

FIG. 6 illustrates another embodiment of this invention wherein the enlargement or reduction of the screen is carried out gradually and continuously by the use of a prism type anamorphic lens. In this embodiment, in the sound track $S_1$ of a film F are also recorded sound frequency (for example, from 60 to 12,000 cycles) and signal frequency (for example, from 20 to 50 cycles), and at the time of reproduction the frequencies are selected by filters 35 and 41 to transmit the sound frequency through a filter 35 to a speaker 36 to be reproduced therefrom and on the other hand to transmit the signal frequency through a filter 41 and an amplifier 42 to rotate a motor 43 by the amplified output by said amplifier 42. The axle of the motor 43 is provided with a governor 44 adapted to move a lever 45 according to the speed of the rotation of the axle, and the lever 45 acts to rotate a shaft 4′ of the prism type anamorphic lens 4. Accordingly by changing the frequency of the signal from 20 cycles to 50 cycles gradually, the number of rotation of the motor 43 may be changed gradually in proportion and the axes of the prisms are rotated to change the projection width angle accordingly.

The use of the signal frequency as mentioned above will have advantages compared with the system using conductive foils of FIG. 1 as follows:

(1) The conductive foils have the tendency to be worn out by friction and removed from the film. The signal frequency recorded in the sound record zone of a film, however, can last a long time.

(2) No special equipment is required for receiving the signal and the pick up of the conventional projector can be used as it is for the purpose.

(3) It is convenient for compilation or mass production of films.

(4) The prism type changeable anamorphic lens can be automatically driven.

While in the above, an example where a pivotable mirror 2 is used with reference to FIGS. 1–3, the mirror 2 may be replaced by a slidable mirror. FIG. 7 illustrates one of such embodiments. In the drawing, 2′ represents a slidable mirror.

On the top and the bottom of the mirror 2′, guide rails 53, 53 are provided and the upper and bottom edges of the mirror 2′ are guided by said rails. In order to move the mirror according to the progress of the film, a gear wheel 54 is provided which is driven by a motor 55 when it is energized by a relay which acts to operate the motor 55 according to the position of the film in the projector.

The gear wheel 54 is connected with the mirror 2′ by a connecting rod 56 whereby to move the mirror 2′ when the gear wheel 54 is rotated. When the gear wheel 54 is rotated to a predetermined position and consequently the mirror 2′ is moved to a predetermined position, the rotation of the gear wheel 54 is stopped to maintain the mirror 2′ in said position by stopper assembly 57, 58 and 58′.

It is to be understood that the direction of the rotation of the motor is reversed by a relay so that mirror 2′ will be reciprocated along guide rails 53.

In the drawing, a master lens is illustrated in its position fixed by means of threads 59 while an anamorphic lens is fixed by means of screw 60. The position of fixed mirror 3′ is adjustable by means of an adjustment screw 61 relative to a pivot 62. It will be convenient if a handle 63 is provided for manual operation of the gear wheel 54 for the eventuality which might occur through a failure of the driving system of the mirror 2′ for some reason. 64 is a glass plate provided for the protection of the mirror 3′.

According to this embodiment, the movement of the mirror will be carried out more smoothly than the embodiment of FIG. 1 and there will be avoided any vibration of the image which may be caused when the mirror of FIG. 1 is lowered and is stopped by movement against the stopper.

It is preferable to interpose a spring 65 in the groove of the guiding rail 53 in the clearance between one side surface of the groove and one surface of the mirror 2′ so that the other surface of the mirror is pressed against the other side surface of the mirror so that the mirror may be maintained in correct position thereby maintaining a correct angle of inclination.

The device of FIG. 7 has another advantage in that the length of the system in the direction of the projection ray can be shortened because of the fact that the mirror is always maintained in an inclined position.

A film having recorded signals on a sound track has been explained above with reference to FIG. 5. However, the signal frequency may be recorded separately from the sound track $S_1$ on a different zone. FIG. 8 illustrates such an embodiment. As shown in the drawing, in the lower edge of the drawing, are provided the sound track $S_1$ and a track of signal frequency $S_2$. Said signal track $S_2$ may be prepared separately, if desired, from the film F and affixed thereto on a coated zone of the film. The upper edge of the drawing illustrates another embodiment of the recording of signal frequency wherein the signal frequency is recorded in a coating $S_3$ provided on a perforation zone of a film.

When signal frequencies are recorded on a separate track other than a sound track, it is evident that there is no necessity of separating two kinds of frequencies for the operation and the sound frequency is not affected at all by the presence of the signal frequency. When the width of the film is limited, the utilization of the perforation zone will be convenient.

In all the embodiments above described, mirrors are employed for passing a light ray selectively through an anamorphic lens 4, but it may be arranged to maintain the direction of light ray constant and to change the position of an anamorphic lens to achieve the same object. FIG. 9 illustrates one of such embodiments. In the drawing, a turret 71 is rotatably arranged in front of a projector 1. The ray coming through a master lens 1′ of the projector 1 proceeds to a screen (not shown) with no deflection. In the passage from the master lens 1′ to the screen, an anamorphic lens 4 is interposed or removed by the rotation of the turret 71. The rotation of the turret 71 is controlled by a device comprising a relay controlled by signals or conductive foils provided on a film and a motor M as already explained with reference to other embodiments. 72 is an ordinary lens or plain window and 73 is a stopper device for fixing the turret 71 in definite positions for enlargement and reduction of the image.

The principle and the idea of this invention may also be utilized for the projection of a film in order to obtain images of different sizes on a screen according to the parts of the film by means of a sliding plate provided with windows of different sizes. FIG. 10 illustrates one of such embodiments. A sliding plate 81 is slidably arranged in front of a master lens 1′ of a projector 1, and is guided by guiding rails 82, 82. Said sliding plate 81 has windows 83, 84 of a large size and a small size, and is moved up and down by means of a rotary wheel 85 and a connecting rod 86. The wheel 85 is operated by means of a relay and a motor 14 which are controlled by the signal mark on a film proceeding in the projector as already explained with reference to other embodiments and is stopped by a stopper device 87 when the window 83 or 84 of the sliding plate 81 is brought to proper position in front of the projector 1. 88 is a projecting lens in a fixed position.

In the above, some of the embodiments of the present invention have been explained. But it must not be understood that this invention is limited by the embodiments as illustrated, since various modifications and variations possible without departing from the scope and the spirit of the present invention.

Since the system of this invention makes it possible to enlarge or reduce the size of a screen of an image by a simple apparatus according to the progress of a film, as explained above, the effect and the real feeling of the film can be improved greatly to make it much more enjoyable.

It is another important advantage that expenses, such as those of electric power and labor, are decreased greatly compared with conventional wide-screen type movie systems, because the present system normally projects small images, but sometimes enlarges the images as desired, while using a single system.

What is claimed is:

1. A motion picture projecting system comprising a projector including an anamorphic and a further lens and a master lens in operative association therewith, said projector being adapted to change magnification according to signal marks provided on a film having parts taken by an anamorphic lens system and parts taken by a second type of lens system, and a screen adapted to change size according to the size of the image projected, an attachment detachably fixed to said projector and comprising a movable mirror and a fixed mirror and a fixed anamorphic lens for the magnification of the image to be projected, the movable mirror being located between the anamorphic lens and the master lens of said projector, driving means for moving said mirror, relay means responsive to the signal marks on the film to operate said driving means and cause the mirror to take positions to direct light rays from the master lens to the anamorphic lens and further lens selectively to change said magnification, the screen including a fixed central portion for one size of the image and additional side portions constituted by a plurality of rectangular plates of relatively small width which have reflective and black surfaces and are rotatable on respective longitudinal axes thereby to control the area of the screen in cooperation with the fixed central portion, and a driving means responsive to the signal marks on the film to control rotation of said plates.

2. A motion picture projecting system according to claim 1, wherein the attachment comprises a casing, and top and bottom guide rails fixed in the casing and slidably supporting said movable mirror; a motor constituting the first said drive means being fixed in the casing and operated according to the signal marks on the film, a wheel rotated by the motor, a link connecting the movable mirror and the wheel, said anamorphic lens being fixed on the optical axis of the master lens, and a mirror fixed in the casing to receive light reflected from the movable mirror when it is located between the master lens and the anamorphic lens and to direct the light through a window provided in the casing.

3. A motion picture projecting system according to claim 1, wherein the attachment comprises a casing detachably mounted in front of the master lens, the movable mirror being pivoted in the casing; a motor constituting the first said drive means being fixed in the casing and operated by said relay according to the signal marks on the film, a link system connecting the motor and the movable mirror, the anamorphic lens being attached to the casing to intercept light from the master lens, a mirror fixed in the casing to receive light reflected from the movable mirror when it is located between the master lens and the anamorphic lens and to direct the light through a window provided in the casing.

References Cited in the file of this patent

UNITED STATES PATENTS

| | | |
|---|---|---|
| 1,080,692 | Hochstetter | Dec. 9, 1913 |
| 1,310,776 | Akeley | July 22, 1919 |
| 1,829,634 | Chretien | Oct. 27, 1931 |
| 1,950,518 | Read | Mar. 13, 1934 |
| 2,503,083 | Waller | Apr. 4, 1950 |
| 2,680,999 | Newton | June 15, 1954 |
| 2,737,083 | Dowling | Mar. 6, 1956 |

FOREIGN PATENTS

| | | |
|---|---|---|
| 472,165 | Germany | Feb. 26, 1929 |
| 711,478 | Great Britain | July 7, 1954 |